Reissued Sept. 22, 1931

Re. 18,205

UNITED STATES PATENT OFFICE

HERBERT L. SHALLCROSS, OF COLLINGDALE, PENNSYLVANIA, ASSIGNOR TO THE SHALLCROSS COMPANY, OF PHILADELPHIA, PENNSYLVANIA, A CORPORATION OF DELAWARE

STENCIL SHEET

No Drawing. Original No. 1,674,611, dated June 19, 1928, Serial No. 226,817, filed October 17, 1927. Application for reissue filed June 19, 1930. Serial No. 462,394.

This invention, generally stated, relates to stencil sheets and has more especial relation to a stencil sheet in which in contradistinction to a porous base of soft wax, there is applied thereto or impregnated thereupon a coating material or base having a type impressible coating composed of seed lac or other lac as a base, combined with nitrated cotton and camphor gum, as a hardener and binder commingled with castor oil as a tempering agent and sperm oil or the like to keep the stencil in usual condition.

The object of my novel present invention is in the provision of a novel stencil sheet of the character above indicated in which a novel coating or impregnating material characteristically different from anything which has been heretofore developed, which when applied to the foundation sheet results in a much stronger stencil sheet, thereby overcoming the weakness in present day stencils, which is at all times ready for use by inserting the same in a writing machine and typing thereon.

A further object of the present invention is to provide a novel stencil sheet of the character stated and above indicated in which there is used as a base for the stencil sheet seed lac or other suitable lac in combination with a solution of nitrated cotton as a hardener and binder commingled with certain oils for the attainment of a much more efficient and stronger stencil sheet thereby overcoming the weakness of present day stencils, as is well known now to the trade and upon the market.

To the above ends my present invention resides in the coating or impregnating of a stencil sheet of the character stated with a preparation composed of a base of suitable lac, camphor gum and nitrated cotton, as a hardener or binder.

A further object of the present invention is to provide a stencil sheet of the character stated coated or impregnated with a material composed of a suitable lac, nitrated cotton, camphor gum and a tempering agent, as castor oil.

A further object of the present invention is to provide a stencil sheet of the character above stated, coated or impregnated with the materials above itemized in connection with sperm or other suitable oil to maintain the stencil sheet in pliable and usable condition.

The invention consists of the novel stencil sheet hereinafter described and finally claimed.

In carrying out the present invention I employ a base of open texture or porous material of any suitable character. This base I coat or impregnate with a solution calculated to overcome the weakness of present day stencil sheets. The material or composition which I employ and from which excellent results have been obtained is comprised of a base of seed lac or other suitable lac dissolved in alcohol; a solution of nitrated cotton treated with a suitable solvent including camphor gum, and castor and sperm or other suitable oils.

The proportions of ingredients I prefer to employ in the novel coating or impregnation of a stencil sheet may be set forth, as follows, to wit:—

As a base I prefer to employ substantially six ounces of seed lac or other suitable lac dissolved in about approximately 1 to 10 parts of alcohol. To this solution I add substantially three ounces of nitrated cotton dissolved in about 100 parts of a suitable solvent, to which latter has been added substantially 1 ounce of camphor gum. It will be noted that camphor is a non-volatile solvent of nitrocellulose and the lac. To the solution thus prepared I add as a tempering agent substantially three ounces of castor oil. The camphor gum and the castor oil operate as plasticizers for this base. In order to provide pliability to the stencil sheet, I add to the ingredients above enumerated, approximately fifty ounces of sperm or other suitable oil. The sperm oil operates to extend the mass of mixed lac, nitrated cotton, and other ingredients without being a solvent of the lac or nitrated cotton, and confers upon it the pliability and displaceability necessary for the stencilizing operation, so that the resultant stencil sheet may have its coating stencilized or displaced for the passage of the printing ink. In this connection it may be noted that the said lac or other lac is used as a base, and that the solution of nitrated cotton is used as a hardener or binder, so that a much stronger stencil sheet is provided than heretofore, thus overcoming the weakness of present day stencil sheets.

Suitable coloring matter may be added at any desired stage of the commingling of the above ingredients, such as a dye or carbon black, which may have been previously dissolved in the solvents employed, such as alcohol or in a common solvent of the solution.

The basic open texture, porous or bibulous paper employed may be coated with the composition above described in any suitable manner as by drawing one surface of said paper into contact with or floating it upon the surface of said composition, and then if necessary, removing or draining off any excess of the composition or material by drawing the coated sheet over a taut wire or straight edge or the like, and the coated sheet then hung up to dry.

There is in practice sufficient evaporation of the alcohol in about a half-hour's time to permit handling of the sheet, which when dry is ready for use. For transportation, storage and handling, sheets of oil paper may be packed between the stencil sheets whose tackiness if present is hardly appreciable, the oil sheets being preferably removed before putting the stencil sheets to use.

My novel stencil sheet is highly economical of ink during the operation of producing stencil copies therefrom, and there is no necessity for blotting the stencil copies or to interleave sheets therewith, as sometimes now has to be done. The stencil copies can be handled at once without danger of smearing the ink thereon, and the stencil sheet preserves its original form, notwithstanding wrinkling, crumpling and rough handling, and it will be found to be elastic, and does not permanently stretch, nor do the fibres of the tissue base loosen or pull apart.

My invention is not limited to the exact proportions given, and within the scope of the appended claims,—various substitutes or equivalents may be used for the base hardener and binder, as will be understood by those skilled in chemistry.

I have found in practice, that by my novel stencil sheet made as above described, the coating remains throughout an extended period of time practically unchanged, and without preliminary moistening is capable of being removed or displaced, as by the blow of the type of a writing machine, or by the pressure of a hand stylus, from or on the underlying foundation sheets, leaving the open texture fibres of the latter practically intact for the support of the centers of loop letters. It will further be found that the spaces corresponding with the lines or the characters will be substantially clear of the coating material, so as to permit the passage of ink therethrough when the sheet is used in the ordinary manner, as in a stencil duplicating machine.

Having thus described my invention, what I claim as new and useful and desire to secure by Letters Patent, is:—

1. A stencil sheet adapted for conversion into a stencil by impact of type thereon, comprising a paper sheet of open texture, porous material, having a type impressible coating thereon, consisting of a base of lac dissolved in alcohol, and having added thereto dissolved nitrated cotton, camphor gum, and oils.

2. A stencil sheet adapted for conversion into a stencil by impact of type thereon, comprising a paper sheet of open texture, porous material, having a type impressible coating thereon, consisting of a base of lac dissolved in alcohol, and having added thereto dissolved nitrated cotton, camphor gum, castor oil and sperm oil.

3. A stencil sheet adapted for conversion into a stencil by impact of type thereon, comprising a paper sheet of open texture, porous material, having a type impressible coating thereon, consisting of a base of six ounces of lac dissolved in alcohol, and having added thereto about three ounces of dissolved nitrated cotton and about one ounce of camphor gum, and fifty-three ounces of oils.

4. A composition for coating or impregnating a stencil sheet, which consists of a base having a type impressible coating including seed lac dissolved in alcohol, dissolved nitrated cotton and camphor gum, a tempering agent of castor oil, equal in weight to said nitrated cotton, and a greater quantity of sperm oil.

5. A composition for coating or impregnating a stencil sheet which consists of about six ounces of seed lac dissolved in about one to ten parts of alcohol, about three ounces of dissolved nitrated cotton dissolved in one hundred parts of a solvent, one ounce of camphor gum, a tempering agent of about three ounces of castor oil, and about fifty ounces of sperm oil.

6. A stencil sheet adapted for conversion into a stencil by impact of type thereon, comprising a paper sheet of open texture, porous material, having a type impressible coating thereon consisting of a mixture of lac, nitrated cotton, a non-volatile solvent for the mixture of lac and cotton, and a liquid extending agent which is not a solvent for the nitrated cotton or the lac.

7. A stencil sheet adapted for conversion into a stencil by impact of type thereon, comprising a paper sheet of open texture, porous material, having a type impressible coating thereon consisting of a mixture of lac, nitrated cotton, a non-volatile solvent for the mixture of lac and nitrated cotton in quantity not greater than the quantity of lac and cotton, and a larger quantity of liquid extending agent than the quantity of lac, nitrated cotton and non-volatile solvent, said extending agent being a non-solvent for the cotton and lac.

8. A stencil sheet adapted for conversion into a stencil by impact of type thereon, comprising a paper sheet of open texture, porous material, having a type impressible coating thereon, consisting of a mixture of lac, a quantity of nitrated cotton less than the quantity of lac, a non-volatile solvent for the mixture of lac and cotton in quantity less than the combined quantity of lac and cotton, and a liquid extending agent in quantity greater than the combined quantity of lac and cotton, said extending agent being a non-solvent for the cotton and lac.

9. A stencil sheet adapted for conversion into a stencil by impact of type thereon, comprising a sheet of open texture, porous material having a type-impressible coating thereon consisting of a mixture of lac, nitrocellulose, a plasticizer which is a solvent for the nitrocellulose and lac, and a liquid extending agent which is not a solvent for the nitrocellulose and lac.

In testimony whereof, I affix my signature

HERBERT L. SHALLCROSS.